C. SUITER.
MEASURING HOPPER.
APPLICATION FILED MAY 29, 1906.
903,617.
Patented Nov. 10, 1908.
2 SHEETS—SHEET 1.
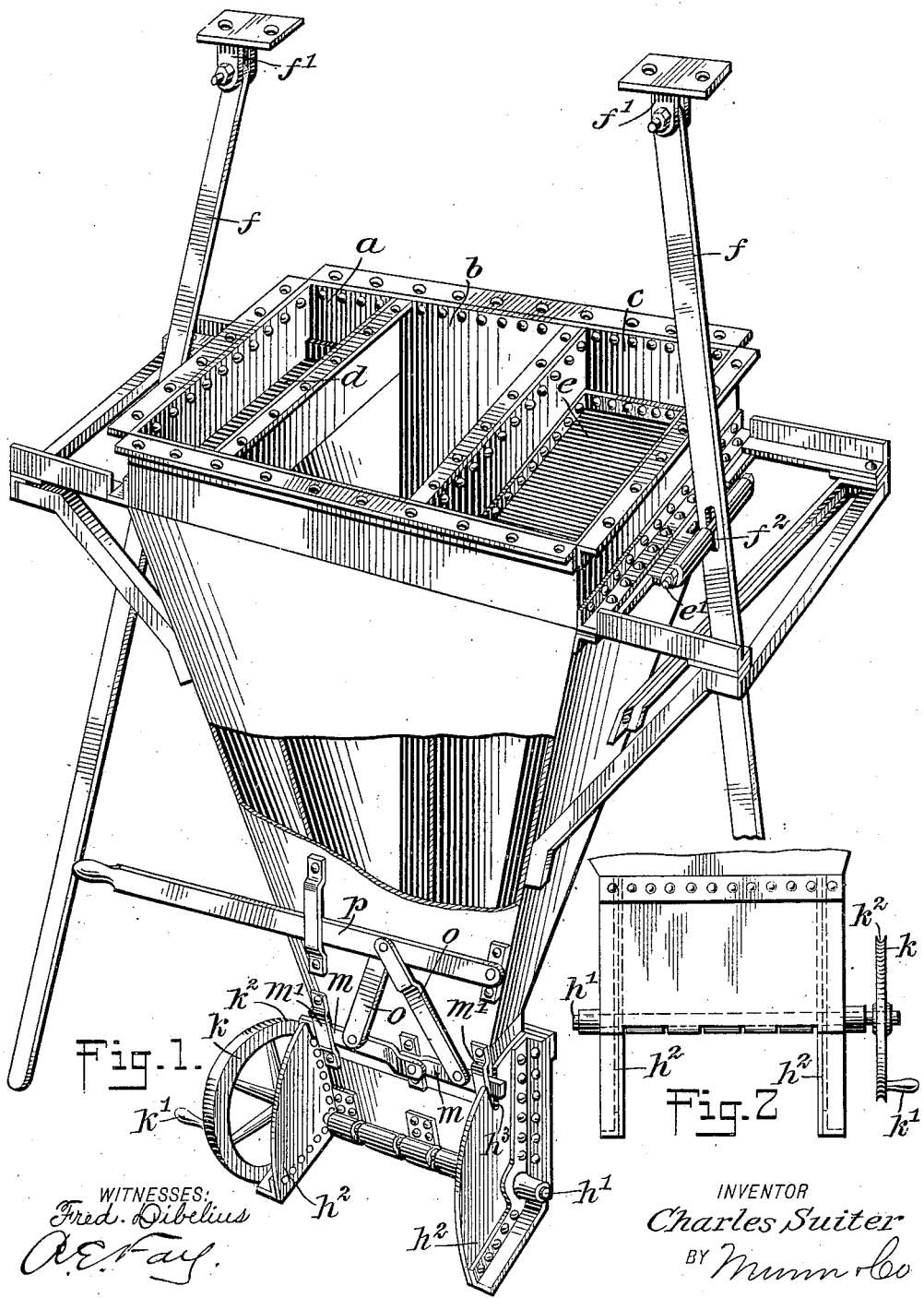
WITNESSES:
Fred. Dibelius
A. E. Fay
INVENTOR
Charles Suiter
BY Munn & Co
ATTORNEYS C. SUITER.
MEASURING HOPPER.
APPLICATION FILED MAY 29, 1906.
903,617.
Patented Nov. 10, 1908.
2 SHEETS—SHEET 2.
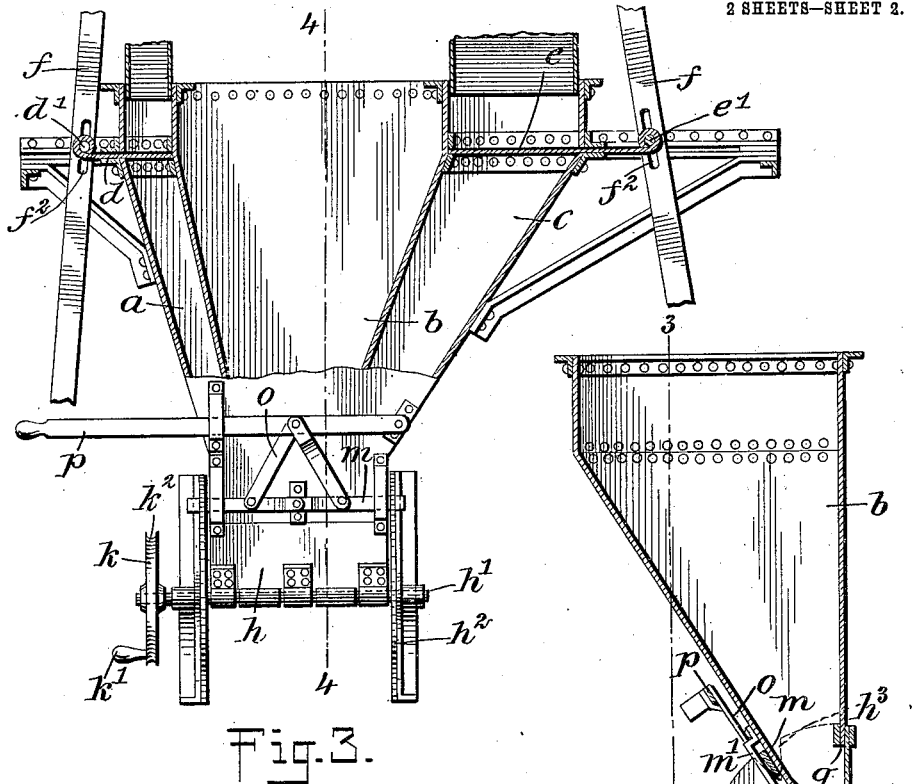
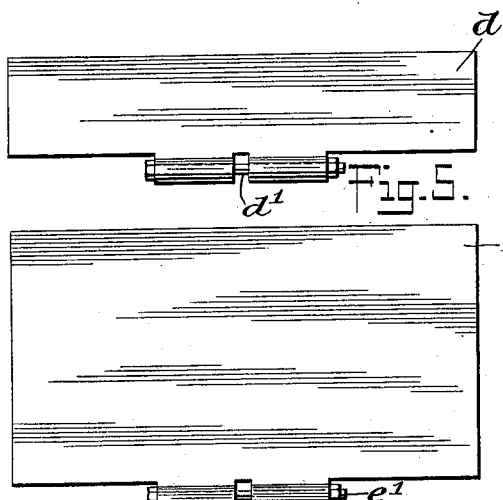
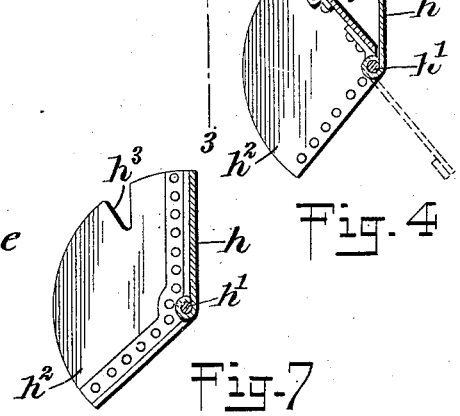
WITNESSES:
Fred. Dibelius
A. E. Fay.
INVENTOR
Charles Suiter
BY Munn & Co
ATTORNEYS

UNITED STATES PATENT OFFICE.

CHARLES SUITER, OF BILLINGS, MONTANA.

MEASURING-HOPPER.

No. 903,617.     Specification of Letters Patent.     Patented Nov. 10, 1908.

Application filed May 29, 1906. Serial No. 319,276.

*To all whom it may concern:*

Be it known that I, CHARLES SUITER, a citizen of the United States, and a resident of Billings, in the county of Yellowstone and State of Montana, have invented a new and Improved Measuring-Hopper, of which the following is a full, clear, and exact description.

My invention relates to a measuring or portioning hopper capable of use in many ways, but especially adapted for mixing materials for compositions, the principal objects being to provide means whereby predetermined quantities of the materials for a composition can be fed simultaneously from the hopper.

In the present case as I especially wish to apply the device to the making of concrete, I have provided for the delivery of predetermined quantities of three substances; viz,—cement, stone and sand.

Other objects of the invention are to provide means for manipulating the parts of the device in a very simple manner in order to connect the sand and cement parts of the hopper with a source of supply, and cut-off the supply of materials at will in order to charge the device with the desired amount, and to provide for conveniently delivering and directing the materials into a mixing device, or the like, and in short, to generally improve a construction and simplify devices of this character.

Reference is to be had to the accompanying drawings forming a part of this specification, in which similar characters of reference indicate corresponding parts in all the figures.

Figure 1 is a perspective view of a measuring or portioning hopper showing the principles of my invention parts thereof being broken away; Fig. 2 is a side elevation of a portion of the same; Fig. 3 is a sectional view on the line 3—3 of Fig. 4, showing parts broken away and a front elevation of the lower portion of the device; Fig. 4 is a sectional view on the line 4—4 of Fig. 3; Fig. 5 is a plan of a cutting-off gate used for the cement; Fig. 6 is a similar view of a similar gate used for sand, and Fig. 7 is an end elevation of a delivering gate which I use, parts being shown in section.

I have illustrated a hopper comprising three compartments, $a$, $b$ and $c$ for cement, stone and sand, respectively. This hopper is designed to be supported from above, and the sand and cement hoppers to be connected with sources of supply adapted to direct these materials into the upper parts of these compartments at all times. For the purpose of controlling the discharge of the material from the sources of supply into the sand and cement compartments, I have shown a pair of gates $d$ and $e$. These gates slide in ways or guides through the sides of the hopper, and are operated by means of levers $f$. These levers are pivoted to brackets $f'$ preferably secured to the ceiling, and are provided with slots $f^2$ through which project pins $d'$ and $e'$ secured to the sliding gates. It will be obvious that these gates may be manipulated by hand to cut off the source of supply or to admit material to these two compartments. The central compartment is not filled in this way, being supplied with broken stone, or the like, in any desired manner. The three compartments are so proportioned that when the central one is filled from the outside and the other two are filled and the supply cut off by the closing of the gates, the relative amounts of cement, sand and stone will be proper for the formation of the grade of concrete desired. In order to discharge the material from the hopper, I have provided mechanism as follows:

The lower end of the hopper is provided with an opening $g$ which extends across the three compartments and discharges material from all of them. This opening is normally closed by a gate or door $h$, which is pivoted on a shaft $h'$. On this shaft is mounted a wheel $k$ having a handle $k'$ for operating it, and a groove $k^2$ about which may pass a rope, chain, cable, or the like, whereby the wheel can be manipulated from a distance, or by turning the handle. The gate $h$ is normally kept in closed position by the use of a pair of segmental flanges $h^2$ concentric with the shaft $h'$ having notches $h^3$ therein; and these notches are adapted to engage pivoted latches $m$ which are located on the hopper and work in guides $m'$. These latches are manipulated by links $o$ connected with a lever $p$ within reach of the operator. It will be observed that when the lever $p$ is raised the latches will be raised and the wheel $k$ can be turned to open the gate $h$ and allow the contents of the hopper to be discharged into a mixing device. While the hopper is discharging its contents, the lever $p$ may be allowed to drop back by gravity, and the latches will then be in such position on the surface of the flanges $h^2$ that they will drop into the slots $h^3$ whenever the gate is closed, and automatically lock it in closed position.

It will be seen that as the sand and cement compartments of the hopper are directly connected with storage bins containing these materials, and the solid columns of sand and cement are cut through by the gates $d$ and $e$, the proper proportions of ingredients for the mixture can be absolutely measured in the device and delivered in the proper manner. By manipulating the device in this manner, a great saving in labor is secured, as the operator attending to the mixture can control the gates $d$ and $e$, and from two to six persons can be eliminated from the mixer crew. The great simplicity of the entire device will be obvious.

Having thus described my invention I claim as new and desire to secure by Letters Patent:

1. A hopper having a plurality of compartments, certain of said compartments being provided with sliding gates, said gates having pins, levers each having a slot for receiving one of said pins, means for simultaneously discharging material from all of said compartments, said last-named means comprising a pivoted gate, a segmental flange connected with said gate and having a notch, a latch for engaging said notch, and means for manipulating said latch.

2. A hopper having an opening in the bottom thereof, a shaft mounted below said opening, a gate pivotally mounted on said shaft, a segmental flange on said gate concentric with said shaft and having a notch, a latch adapted to engage said notch, a lever for manipulating said latch, and means for manipulating said gate, said means comprising a grooved wheel on said shaft.

In testimony whereof I have signed my name to this specification in the presence of two subscribing witnesses.

CHARLES SUITER.

Witnesses:
W. M. JOHNSTON,
BLANCHE NICKEY.